United States Patent
Yamaguchi et al.

(10) Patent No.: US 9,813,577 B2
(45) Date of Patent: Nov. 7, 2017

(54) IMAGE FORMING APPARATUS, ACTIVATION CONTROL METHOD, AND NON-TRANSITORY COMPUTER-READABLE RECORDING MEDIUM ENCODED WITH ACTIVATION CONTROL PROGRAM

(71) Applicant: Konica Minolta, Inc., Chiyoda-ku, Tokyo (JP)

(72) Inventors: Takehisa Yamaguchi, Ikoma (JP); Atsushi Ohshima, Amagasaki (JP); Toshihiko Otake, Ikeda (JP); Hiroaki Kubo, Muko (JP); Masaya Hashimoto, Itami (JP); Toshimichi Iwai, Nara-ken (JP); Tomoaki Nakajima, Kobe (JP); Takeshi Morikawa, Takarazuka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/824,585

(22) Filed: Aug. 12, 2015

(65) Prior Publication Data
US 2016/0057304 A1 Feb. 25, 2016

(30) Foreign Application Priority Data
Aug. 20, 2014 (JP) .................................. 2014-167451

(51) Int. Cl.
*H04N 1/00* (2006.01)
(52) U.S. Cl.
CPC ..... *H04N 1/00904* (2013.01); *H04N 1/00891* (2013.01)
(58) Field of Classification Search
USPC ....................................................... 358/1.14
See application file for complete search history.

(56) References Cited

U.S. PATENT DOCUMENTS

2006/0001909 A1* 1/2006 Kawaura ............... G06F 9/4406
358/1.16
2010/0115258 A1* 5/2010 Jeon ..................... G06F 9/4418
713/2

(Continued)

FOREIGN PATENT DOCUMENTS

JP 2009-187134 A 8/2009
JP 2012-249220 A 12/2012

(Continued)

OTHER PUBLICATIONS

Notice of Ground of Rejection issued in corresponding Japanese Patent Application No. 2014-167451, dated Oct. 4, 2016 and English language translation thereof (16 pages).

*Primary Examiner* — Ngon Nguyen
(74) *Attorney, Agent, or Firm* — Buchanan Ingersoll & Rooney PC

(57) ABSTRACT

An image forming apparatus includes a main processor, a first memory, a sub processor, and a second memory. The second memory stores a snapshot that includes an executable program obtained by loading one or more programs in the first memory. The main processor switches from a drive mode to a stop mode. The sub processor activates the main processor in response to any one of a plurality of activation factors being detected, cuts off power in response to an operation mode being switched to the stop mode, and supplies power to the main processor and the first memory before the main processor is activated. The main processor reads out a snapshot associated with an activation factor from the second memory and stores the snapshot into the first memory in response to being activated by the sub processor.

19 Claims, 9 Drawing Sheets

(56) References Cited

U.S. PATENT DOCUMENTS

| | | | |
|---|---|---|---|
| 2010/0238507 A1* | 9/2010 | Matsushima | G03G 15/50 358/1.16 |
| 2013/0036300 A1* | 2/2013 | Baik | G06F 9/4401 713/2 |
| 2013/0036319 A1* | 2/2013 | Tanaka | G03G 15/5004 713/323 |
| 2013/0042097 A1* | 2/2013 | Baik | G06F 9/4401 713/2 |
| 2013/0258409 A1 | 10/2013 | Shintani | |
| 2014/0173315 A1 | 6/2014 | Yokoyama | |

FOREIGN PATENT DOCUMENTS

| | | |
|---|---|---|
| JP | 2013-034072 A | 2/2013 |
| JP | 2013-210437 | 10/2013 |
| JP | 2014-117855 A | 6/2014 |

* cited by examiner

F I G. 2
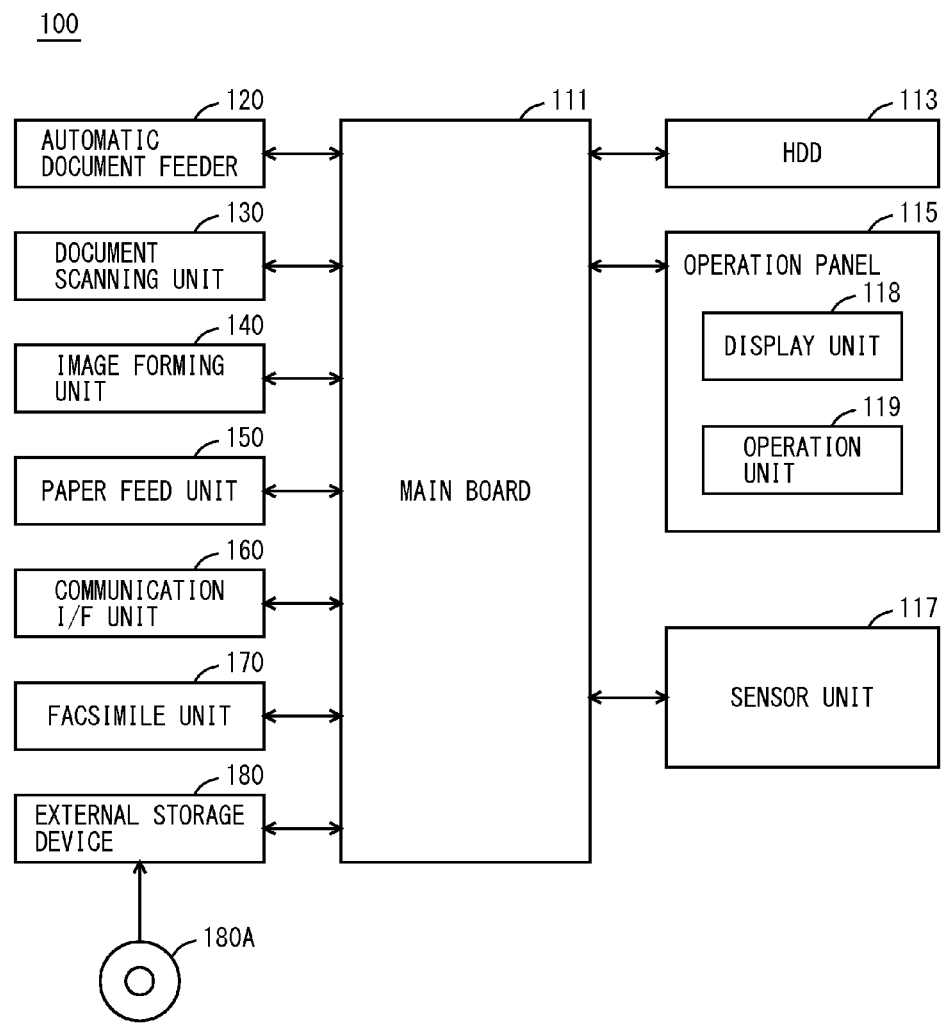

FIG. 5

PROGRAM DEFINITION TABLE

| ACTIVATION FACTOR | PROGRAM |
|---|---|
| MAINTENANCE KEY | MAINTENANCE PROGRAM<br>HDD CONTROL PROGRAM<br>PANEL CONTROL PROGRAM |
| STATUS CHECK KEY | ERROR STATE NOTIFYING PROGRAM<br>SENSOR CONTROL PROGRAM<br>PANEL CONTROL PROGRAM |
| FRONT DOOR OR PAPER FEED TRAY OPEN | |
| FACSIMILE RECEIVED | FACSIMILE RECEIVING PROGRAM<br>FACSIMILE CONTROL PROGRAM<br>IMAGE FORMING PROGRAM<br>ASIC CONTROL PROGRAM |
| PRINT JOB RECEIVED | PRINT JOB RECEIVING PROGRAM<br>COMMUNICATION CONTROL PROGRAM<br>IMAGE FORMING PROGRAM<br>ASIC CONTROL PROGRAM |
| OTHERS | ALL PROGRAMS |

FIG. 6

SNAPSHOT DEFINITION TABLE

| ACTIVATION FACTOR | ADDRESS INFORMATION |
|---|---|
| MAINTENANCE KEY | ADDRESS A |
| STATUS CHECK KEY | ADDRESS B |
| FRONT DOOR OR PAPER FEED TRAY OPEN | ADDRESS B |
| FACSIMILE RECEIVED | ADDRESS C |
| PRINT JOB RECEIVED | ADDRESS D |
| OTHERS | ADDRESS E |

IMAGE FORMING APPARATUS, ACTIVATION CONTROL METHOD, AND NON-TRANSITORY COMPUTER-READABLE RECORDING MEDIUM ENCODED WITH ACTIVATION CONTROL PROGRAM

This application is based on Japanese Patent Application No. 2014-167451 filed with Japan Patent Office on Aug. 20, 2014, the entire content of which is hereby incorporated by reference.

BACKGROUND OF THE INVENTION

Field of the Invention

The present invention relates to an image forming apparatus, and more particularly to an image forming apparatus capable of switching an operation mode to a power saving mode in which power consumption is low, an activation control method for the image forming apparatus, and a non-transitory computer-readable recording medium encoded with an activation control program that allows a computer controlling the image forming apparatus to execute the activation control method.

Description of the Related Art

There has been a growing demand for reducing power consumption of image forming apparatuses typified by MFPs (Multi Function Peripherals) when not driven in a standby state. In this respect, MFPs have been developed in which the CPU (Central Processing Unit) controlling the MFP and the RAM (Random Access Memory) used by the CPU as a working area stop being driven in a standby state. Meanwhile, it is necessary to minimize the time to enter a state in which the CPU can execute a program in order to recover from the standby state.

For example, Japanese Patent Laid-Open No. 2012-249220 describes an image processing apparatus capable of executing a plurality of functions and having operation screens corresponding to the functions. The image processing apparatus includes a power control unit that switches a plurality of power supply modes including a normal mode and a low power consumption mode in which power consumption is lower than in the normal mode, a working memory in which data for implementing a function of the image processing apparatus is expanded in the normal mode, and a snapshot storing unit comprised of a nonvolatile storage medium for storing a snapshot that is image data of the data stored in the working memory, an activation processing unit that reads out the snapshot stored in the snapshot storing unit and restores the snapshot on the working memory when the low power consumption mode is shifted to the normal mode by the power control unit, a time acquisition unit that acquires an activation time corresponding to the restoring by the activation processing unit, a saving processing unit that stores the snapshot in the working memory into the snapshot storing unit in association with the activation time acquired by the time acquisition unit when the normal mode is shifted to the low power consumption mode by the power control unit, and a snapshot selecting unit that selects a snapshot to be read by the activation processing unit from among snapshots stored in the snapshot storing unit, based on the time of shifting and the activation time, when the low power consumption mode is shifted to the normal mode by the power control unit.

In the image processing apparatus described in Japanese Patent Laid-Open No. 2012-249220, since the snapshot is restored in the working memory, the time taken to recover from the low power consumption mode can be reduced when compared with a case where the program is expanded in the working memory. However, a predetermined time is required to restore a plurality of snapshots in the working memory.

SUMMARY OF THE INVENTION

According to an aspect of the present invention, an image forming apparatus includes: a main processor to execute a program; a first memory to store an executable program loaded by the main processor to execute a program; a sub processor to activate the main processor; and a second memory accessible by the main processor and the sub processor. The first memory is a volatile memory, and the second memory is a nonvolatile memory. The second memory stores, for each of a plurality of sets including one or more of a plurality of programs executable by the main processor, a snapshot that includes an executable program obtained by the main processor loading one or more programs included in the set into the first memory. One of the main processor and the sub processor executes an association step of associating any one of a plurality of activation factors with each of a plurality of snapshots respectively corresponding to the plurality of sets. The main processor executes a mode switching step of switching an operation mode from a drive mode in which power is supplied to a stop mode in which power is not supplied. The sub processor executes a power supply control step of switching power supplied to the main processor and the first memory, an activation factor detecting step of detecting any one of a plurality of activation factors while power is not supplied to the main processor, and an activation step of activating the main processor in response to any one of the plurality of activation factors being detected in the activation factor detecting step. The power supply control step includes a cutoff step of cutting off power supplied to the main processor and the first memory in response to an operation mode being switched to the stop mode in the mode switching step, and a power recovery step of supplying power to the main processor and the first memory before the main processor is activated in the activation step. The main processor further executes a recovery step of, in response to being activated by the sub processor, reading out a snapshot associated with the detected activation factor in the association step from the second memory and storing the read snapshot into the first memory.

According to another aspect of the present invention, an activation control method is performed in an image forming apparatus. The image forming apparatus includes a main processor to execute a program, a first memory to store an executable program loaded by the main processor to execute a program, a sub processor to activate the main processor, and a second memory accessible by the main processor and the sub processor. The first memory is a volatile memory, and the second memory is a nonvolatile memory. The second memory stores, for each of a plurality of sets including one or more of a plurality of programs executable by the main processor, a snapshot that includes an executable program obtained by the main processor loading one or more programs included in the set into the first memory. The method allows: one of the main processor and the sub processor to execute an association step of associating any one of a plurality of activation factors with each of a plurality of snapshots respectively corresponding to the plurality of sets; the main processor to execute a mode switching step of switching an operation mode from a drive mode in which power is supplied to a stop mode in which power is not supplied; and the sub processor to execute a power supply control step of switching power supplied to the main processor and the first memory, an activation factor detecting step of detecting any one of a plurality of activation factors while power is not supplied to the main processor, and an activation step of activating the main processor in response to any one of the plurality of activation factors being detected in the activation factor detecting step. The power supply control step includes a cutoff control step of cutting off power supplied to the main processor and the first memory in response to an operation mode being switched to the stop mode in the mode switching step, and a power recovery step of supplying power to the main processor and the first memory before the main processor is activated in the activation step. The method further allows the main processor to execute a recovery step of, in response to being activated by the sub processor, reading out a snapshot associated with the detected activation factor in the association step from the second memory and storing the read snapshot into the first memory.

According to a further aspect of the present invention, a non-transitory computer-readable recording medium is encoded with an activation control program executed in an image forming apparatus. The image forming apparatus includes a main processor to execute a program, a first memory to store an executable program loaded by the main processor to execute a program, a sub processor to activate the main processor, and a second memory accessible by the main processor and the sub processor. The first memory is a volatile memory, and the second memory is a nonvolatile memory. The second memory stores, for each of a plurality of sets including one or more of a plurality of programs executable by the main processor, a snapshot that includes an executable program obtained by the main processor loading one or more programs included in the set into the first memory. The program causes: one of the main processor and the sub processor to execute an association step of associating any one of a plurality of activation factors with each of a plurality of snapshots respectively corresponding to the plurality of sets; the main processor to execute a mode switching step of switching an operation mode from a drive mode in which power is supplied to a stop mode in which power is not supplied; and the sub processor to execute a power supply control step of switching power supplied to the main processor and the first memory, an activation factor detecting step of detecting any one of a plurality of activation factors while power is not supplied to the main processor, and an activation step of activating the main processor in response to any one of the plurality of activation factors being detected in the activation factor detecting step. The power supply control step includes a cutoff control step of cutting off power supplied to the main processor and the first memory in response to an operation mode being switched to the stop mode in the mode switching step, and a power recovery step of supplying power to the main processor and the first memory before the main processor is activated in the activation step. The program further causes the main processor to execute a recovery step of, in response to being activated by the sub processor, reading out a snapshot associated with the detected activation factor in the association step from the second memory and storing the read snapshot into the first memory.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a block diagram showing an example of the overall hardware configuration of the MFP.

FIG. 5 shows an example of a program definition table.

FIG. 6 shows an example of a snapshot definition table.

DESCRIPTION OF THE PREFERRED EMBODIMENTS

Figure 1:
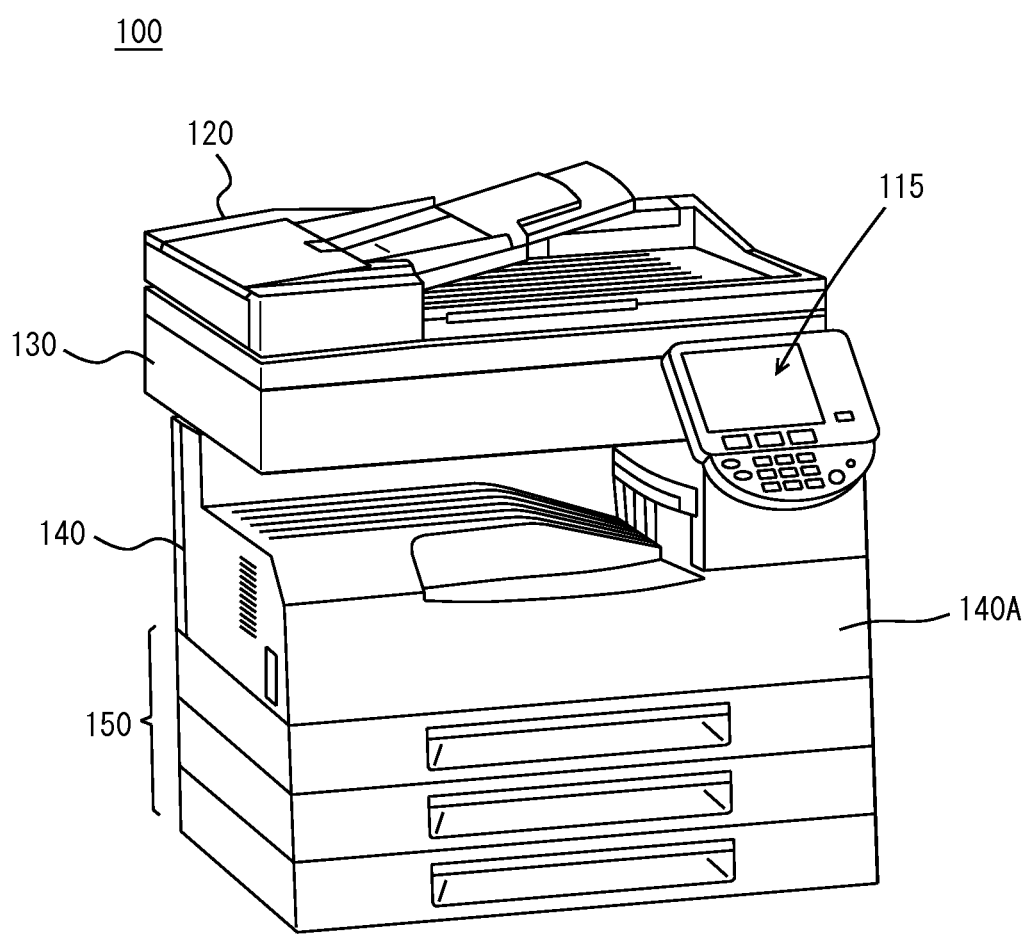
FIG. 1 is an external perspective view of an MFP in an embodiment of the present invention.

Embodiments of the present invention will be described below in conjunction with the figures. In the following description, the same parts are denoted with the same reference numerals. Their names and functions are also the same. A detailed description thereof is therefore not repeated.

FIG. 1 is an external perspective view of an MFP in an embodiment of the present invention. Referring to FIG. 1, MFP 100 is an example of the image forming apparatus and includes a document scanning unit 130 for scanning a document, an automatic document feeder 120 for conveying a document to document scanning unit 130, an image forming unit 140 for forming an image on paper or other medium based on image data output by document scanning unit 130 scanning a document, a paper feed unit 150 for supplying paper to image forming unit 140, and an operation panel 115 as a user interface.

Automatic document feeder 120 automatically conveys a plurality of sheets of a document set on a document feed tray, sheet by sheet, to a predetermined document scanning position set on the platen glass of document scanning unit 130 and discharges the document having a document image read by document scanning unit 130 to a document output tray. Document scanning unit 130 includes a light source emitting light to a document conveyed to the document scanning position and a photoelectric transducer that receives light reflected by the document to scan a document image in accordance with the size of the document. The photoelectric transducer converts the received light into image data that is an electrical signal and outputs the image data to image forming unit 140. Paper feed unit 150 has a plurality of paper feed trays. Each of the paper feed trays stores paper of a predetermined size. Paper feed unit 150 takes out paper sheet by sheet from a paper feed tray that stores paper of the size used in image forming, among the paper feed trays, and conveys the paper to image forming unit 140.

Image forming unit 140 forms an image by a well-known electrophotographic technique. An image is formed on paper conveyed by paper feed unit 150, based on the processed image data obtained by performing a variety of data processing such as shading correction on image data input from document scanning unit 130 or the externally received image data. MFP 100 has a front door 140A that can be opened/closed on the front face of image forming unit 140. Image forming unit 140 is exposed to the outside by opening/closing front door 140A.

Operation panel 115 is provided on the top face of MFP 100 and functions as a user interface that displays an operation screen and accepts an operation by a user.

FIG. 2 is a block diagram showing an example of the overall hardware configuration bf the MFP. Referring to FIG. 2, MFP 100 includes, in addition to automatic document feeder 120, document scanning unit 130, image forming unit 140, and paper feed unit 150 described above, a main board 111, a communication interface (I/F) unit 160, a facsimile unit 170, an external storage device 180, a hard disk drive (HDD) 113 as a mass storage device, operation panel 115, and a sensor unit 117.

Main board 111 is connected with automatic document feeder 120, document scanning unit 130, image forming unit 140, paper feed unit 150, communication I/F unit 160, facsimile unit 170, external storage device 180, HDD 113, operation panel 115, and sensor unit 117.

Communication I/F unit 160 is an interface for connecting MFP 100 to a network. Communication I/F unit 160 communicates with another computer connected to the network via a communication protocol such as TCP (Transmission Control Protocol) or UDP (User Datagram Protocol). The communication protocol is not limited to a particular protocol, and any protocol can be used. The network connected with communication I/F unit 160 is, for example, a local area network (LAN), either wired or wireless. The network is not limited to a LAN but may be a wide area network (WAN), a network using the Public Switched Telephone Network (Public Switched Telephone Network), or other networks. The network is further connected to the Internet. MFP 100 therefore can communicate with a computer such as a server connected to the Internet.

Communication I/F unit 160 outputs data received from the network to main board 111 and outputs data input from main board 111 to the network. Communication I/F unit 160 outputs only the data addressed to MFP 100 to main board 111, among data received from the network, and discards data addressed to a device different from MFP 100, among data received from the network. When data addressed to MFP 100 for inquiring about a domain name, a MAC address, an IP address and the like is received, among data received from the network, communication I/F unit 160 returns a response without outputting the data to main board 111. The data for inquiring about a MAC address is, for example, data in accordance with the ARP (Address Resolution Protocol) standards.

Facsimile unit 170 is connected to the Public Switched Telephone Network (PSTN) to transmit/receive facsimile data. A CD-ROM (Compact. Disk Read Only Memory) 180A or a semiconductor memory is attached to external storage device 180. External storage device 180 reads out data stored in CD-ROM 118 or the semiconductor memory. External storage device 180 stores data into CD-ROM 118 or the semiconductor memory.

Operation panel 115 includes a display unit 118 and an operation unit 119. Display unit 118 is, for example, a liquid crystal display (LCD) and displays instruction menus to users, information about the acquired image data, and other data. Operation unit 119 includes a plurality of hard keys and a touch panel. The touch panel is a multi-touch-supporting touch panel superimposed on the top surface or the bottom surface of display unit 118 and detects a position designated by the user in the display surface of display unit 118.

Sensor unit 117 includes a plurality of sensors of MFP 100 and detects outputs of a plurality of sensors and outputs the detected sensor outputs to main board 111. Sensor unit 117 includes a sensor for detecting opening/closing of front door 140A, a sensor for detecting opening/closing of a plurality of paper feed trays of paper feed unit 150, a remaining paper detection sensor for detecting the quantity of remaining paper, a sensor for detecting opening/closing of the front door for exposing a paper conveyance path to the outside, and a jam sensor for detecting a paper jam in a paper conveyance path.

Figure 3:
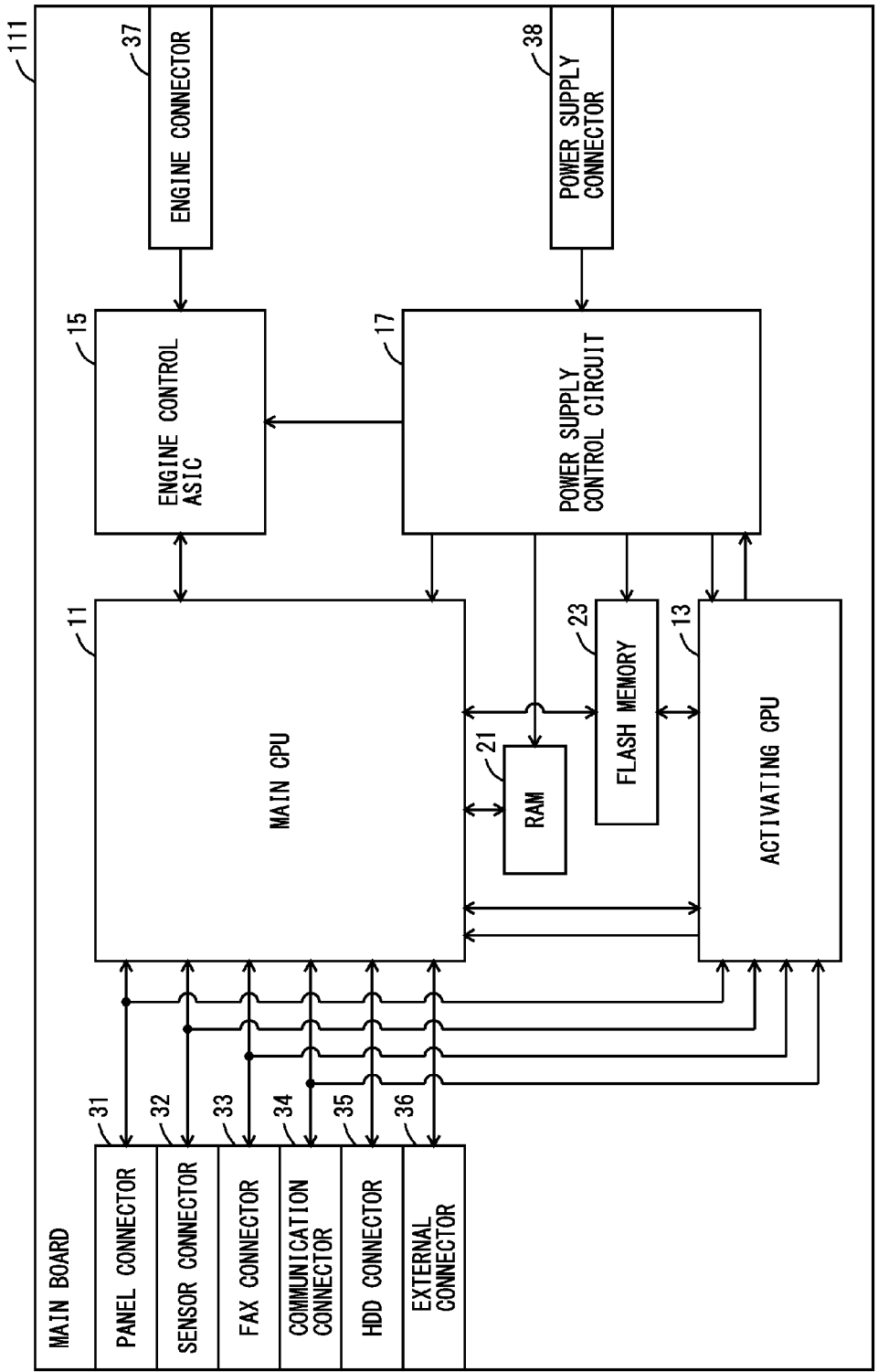
FIG. 3 is a block diagram showing an example of the detailed configuration of a main board.

FIG. 3 is a block diagram showing an example of the detailed configuration of the main board. Referring to FIG. 3, main board 111 includes a main CPU 11, an activating CPU 13, an engine control ASIC (Application Specific Integrated Circuit) 15, a power supply control circuit 17, a RAM 21, a flash memory 23, and connectors 31 to 38.

RAM 21 is a volatile semiconductor memory used as a working area for main CPU 11. Flash memory 23 is a nonvolatile semiconductor memory controlled by main CPU 11 or activating CPU 13.

Panel connector 31 is connected to operation panel 115. When the user inputs an operation to operation unit 119 of operation panel 115, operation unit 119 detects the input operation and outputs operation identification information for identifying the detected operation to panel connector 31. Operations input by the user to operation unit 119 include an operation of pressing a plurality of hard keys of operation unit 119 and an operation of touching the touch panel. When any one of a plurality of hard keys is pressed, operation unit 119 outputs operation identification information including key identification information of the pressed key to panel connector 31. When the touch panel is touched, operation unit 119 outputs operation identification information including the designated position to panel connector 31. When outputting operation identification information to panel connector 31, operation unit 119 changes the voltage of a predetermined activating terminal, among a plurality of terminals of panel connector 31, from LOW to HIGH. When a specific key is pressed from among a plurality of hard keys, operation unit 119 changes the voltage of a predetermined specific terminal corresponding to a specific key, among a plurality of terminals of panel connector 31, from LOW to HIGH. There may be one or more specific keys. The specific keys are a maintenance key and a status check key in the present embodiment. Hereinafter, the specific terminal corresponding to the maintenance key is referred to as the maintenance terminal, and the specific terminal corresponding to the status check key is referred to as the status check terminal.

Sensor connector 32 is connected to sensor unit 117. Sensor unit 117 detects outputs of a plurality of sensors and outputs a signal indicating the state of output from each of the sensors to sensor connector 32. When the state of a predetermined specific sensor among the sensors changes from OFF to ON, sensor unit 117 changes the voltage of a predetermined specific terminal corresponding to the specific sensor, among a plurality of terminals of sensor connector 32, from LOW to HIGH. In the present embodiment, specific sensors are the sensor for detecting opening/closing of front door 140A and the sensor for opening/closing of each of the paper feed trays of paper feed unit 150. The specific terminal corresponding to the sensor for detecting opening/closing of front door 140A and the sensor for detecting opening/closing each of the paper feed trays of paper feed unit 150 are hereinafter referred to as the opening/closing terminal. A single opening/closing terminal is provided for the sensor for detecting opening/closing of front door 140A and the sensors for detecting opening/closing of the paper feed trays of paper feed unit 150. When the sensor for detecting opening/closing of front door 140A detects ON to indicate the opening of front door 140A or any one of the sensors for detecting opening/closing of the paper feed trays detects ON to indicate opening of any one of the paper feed trays, sensor unit 117 changes the voltage of the opening/closing terminal from LOW to HIGH.

FAX connector 33 is connected to facsimile unit 170. When receiving facsimile data, facsimile unit 170 outputs the received facsimile data to FAX connector 33. Facsimile unit 170 transmits the facsimile data input from FAX connector 33. When receiving facsimile data, facsimile unit 170 changes the voltage of a predetermined facsimile notice terminal, among a plurality of terminals of FAX connector 33, from LOW to HIGH.

Communication connector 34 is connected to communication I/F unit 160. When receiving data addressed to MFP 100 from the outside, communication I/F unit 160 outputs the received data to communication connector 34. Communication I/F unit 160 transmits data input from communication connector 34. When receiving a print job from the outside, communication I/F unit 160 changes the voltage of a predetermined job notice terminal, among a plurality of terminals of communication connector 34, from LOW to HIGH.

HDD connector 35 is connected to HDD 113. External connector 36 is connected to external storage device 180.

Main CPU 11 can access flash memory 23 to read out data stored in flash memory 23 or write data into flash memory 23. In particular, main CPU 11 loads one or more programs among a plurality of programs stored in flash memory 23 into RAM 21 for execution. Main CPU 11 also can load a plurality of programs stored in flash memory 23 into RAM 21 for execution. The programs stored in flash memory 23 include a facsimile transmitting program for transmitting facsimile data, a facsimile receiving program for receiving facsimile data, a print job receiving program for receiving a print job, an image forming program for printing image data, a document scanning program for controlling document scanning unit 130 to scan a document, a maintenance program for managing consumables in MFP 100, an error state notifying program for giving notification of an error state, and a plurality of hardware control programs for controlling a plurality of hardware resources. The hardware resources include operation panel 115, sensor unit 117, facsimile unit 170, communication I/F unit 160, HDD 113, external storage device 180, and engine control ASIC 15.

Main CPU 11 is connected to operation panel 115 through panel connector 31. Main CPU 11 controls operation panel 115 by executing a panel control program for controlling operation panel 115 among the hardware control programs. Main CPU 11 is connected to sensor unit 117 through sensor connector 32. Main CPU 11 controls sensor unit 117 by executing a sensor control program for controlling sensor unit 117 among the hardware control programs. Main CPU 11 is connected to facsimile unit 170 through FAX connector 33. Main CPU 11 controls facsimile unit 170 by executing a facsimile control program for controlling facsimile unit 170 among the hardware control programs. Main CPU 11 is connected to communication I/F unit 160 through communication connector 34. Main CPU 11 controls communication I/F unit 160 by executing a communication control program for controlling communication I/F unit 160 among the hardware control programs. Main CPU 11 is connected to HDD 113 through HDD connector 35. Main CPU 11 controls HDD 113 by executing a HDD control program for controlling HDD 113 among the hardware control programs. Main CPU 11 is connected to external storage device 180 through external connector 36. Main CPU 11 controls external storage device 180 by executing an external device control program for controlling external storage device 180 among the hardware control programs. Main CPU 11 is connected to engine control ASIC 15 and controls engine control ASIC 15 by executing an ASIC control program for controlling ASIC 15 among the hardware control programs.

Activating CPU 13 is connected to the activating terminal of panel connector 31 and detects an activation factor in response to the voltage of the activating terminal changing from LOW to HIGH. Activating CPU 13 is also connected to the maintenance terminal and the status check terminal of panel connector 31 and detects an activation factor in response to the voltage of one of the maintenance terminal and the status check terminal changing from LOW to HIGH.

Activating CPU 13 activates main CPU 11 in response to detecting an activation factor in a state in which main CPU 11 is not driven. Specifically, activating CPU 13 is connected to a reset terminal of activating CPU 13 and outputs a reset signal to the reset terminal thereby to activate activating CPU 13. Activating CPU 13 can access flash memory 23 to read out data stored in flash memory 23 or write data into flash memory 23.

Activating CPU 13 is connected to the opening/closing terminal of sensor connector 32 and detects an activation factor in response to the voltage of the opening/closing terminal changing from LOW to HIGH. Activating CPU 13 is connected to the facsimile notice terminal of FAX connector 33 and detects an activation factor in response to the voltage of the facsimile notice terminal changing from LOW to HIGH. Activating CPU 13 is connected to the job notice terminal of communication connector 34 and detects an activation factor in response to the voltage of the job notice terminal changing from LOW to HIGH.

Engine control ASIC 15 is connected to automatic document feeder 120, document scanning unit 130, image forming unit 140, and paper feed unit 150 through an engine connector 37. Engine control ASIC 15 is controlled by main CPU 11 to control automatic document feeder 120, document scanning unit 130, image forming unit 140, and paper feed unit 150. Engine control ASIC 15 has a function of executing predetermined image processing on image data output by document scanning unit 130 scanning a document and a function of converting image data into raster data to be printed by image forming unit 140.

Power supply control circuit 17 is connected to a commercial power source through a power supply connector 38. Power supply control circuit 17 supplies power supplied from the commercial power source to main CPU 11, engine control ASIC 15, activating CPU 13, RAM 21, and flash memory 23. Power supply control circuit 17 is controlled by activating CPU 13 to switch between a state in which power is supplied to main CPU 11, engine control ASIC 15, RAM 21 and flash memory 23 and a state in which power is not supplied to them.

Figure 4:
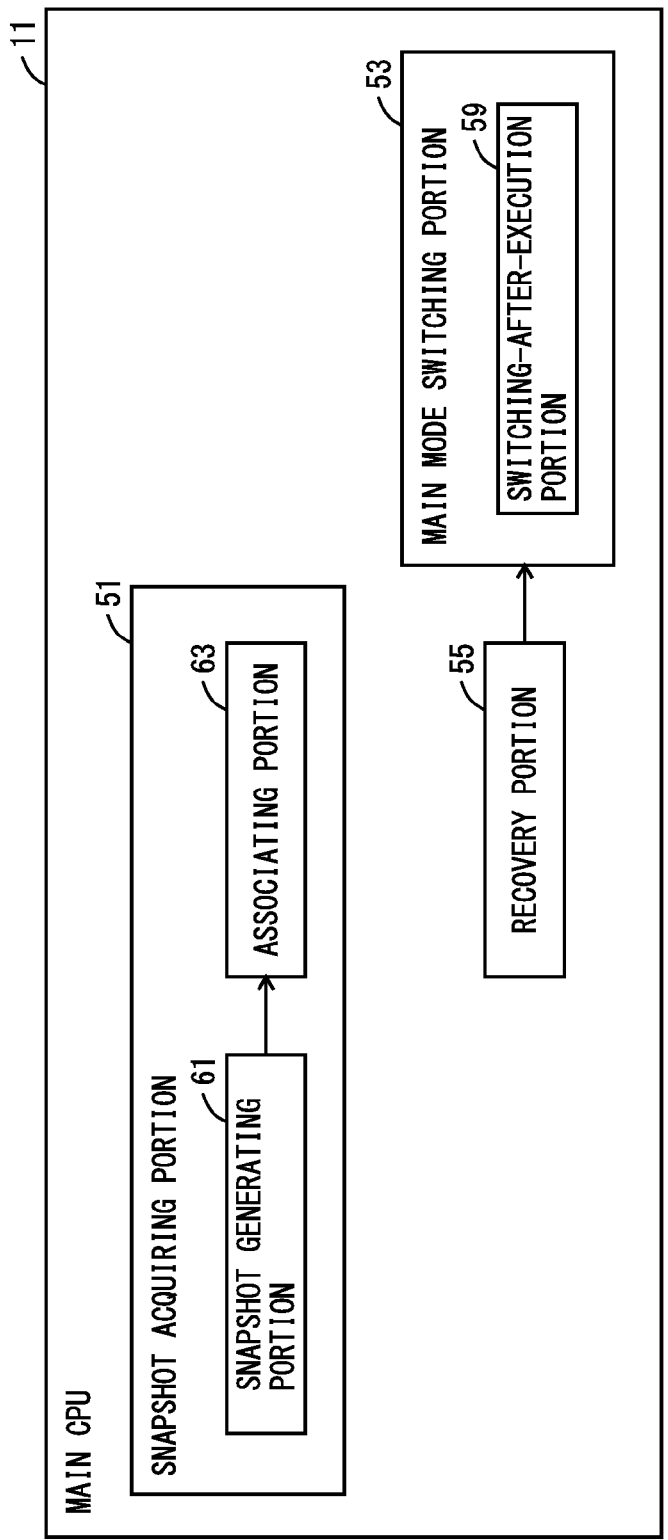
FIG. 4 is a block diagram showing exemplary functions of a main CPU.

FIG. 4 is a block diagram showing exemplary functions of the main CPU. The functions shown in FIG. 4 are formed in main CPU 11 by main CPU 11 executing a main activation control program. The main activation control program is a part of the activation control program. Referring to FIG. 4, main CPU 11 includes a snapshot acquiring portion 51, a main mode switching portion 53, and a recovery portion 55.

Snapshot acquiring portion 51 acquires a snapshot. A snapshot is data stored in RAM 21 in a state in which CPU 11 loads one or more programs among a plurality of programs stored in flash memory 23 into RAM 21. Snapshot acquiring portion 51 includes a snapshot generating portion 61 and an associating portion 63.

Snapshot generating portion 61 loads predetermined one or more programs corresponding to each of a plurality of activation factors into RAM 21 for each activation factor. An executable program corresponding to one or more programs defined for an activation factor is thus stored in RAM 21. The executable program stored in RAM 21 is stored into flash memory 23 as a snapshot that is image data. Snapshot generating portion 61 thus stores respective snapshots corresponding to a plurality of activation factors into flash memory 23. Snapshot generating portion 61 outputs an activation factor and the address in flash memory 23 of the snapshot stored in flash memory 23 corresponding to the activation factor, to associating portion 63.

Specifically, a program definition table is stored in flash memory 23 in advance, in which activation factors are associated with programs. Snapshot generating portion 61 refers to the program definition table to store a snapshot into flash memory 23.

FIG. 5 shows an example of the program definition table. Referring to FIG. 5, the program definition table includes a program definition record for each of a plurality of activation factors. A program definition record includes an activation factor field and a program field. A program definition record including "maintenance key" in the activation factor field includes "maintenance program", "HDD control program", "panel control program" in the program field. A program definition record including "status check key" in the activation factor field and a program definition record including "front door OR paper feed tray open" in the activation factor field include "error state notifying program", "sensor control program", "panel control program" in the program field. A program definition record including "facsimile received" in the activation factor field includes "facsimile receiving program", "facsimile control program", "image forming program", "ASIC control program" in the program field. A program definition record including "print job received" in the activation factor field includes "print job receiving program", "communication control program", "image forming program", "ASIC control program" in the program field. A program definition record including "others" in the activation factor field includes "all programs" in the program field.

Returning to FIG. 4, snapshot generating portion 61 resets RAM 21 and loads a snapshot generating program alone corresponding to snapshot generating portion 61, into RAM 21. For example, the snapshot generating program is stored in flash memory 23, and RAM 21 and CPU 11 are reset after the read address of a program defined in a boot program stored in flash memory 23 is changed to the address at which the snapshot generating program is stored. At a stage when CPU 11 is reset, snapshot generating portion 61 alone is formed in main CPU 11.

Snapshot generating portion 61 reads out a program definition record from the program definition table stored in flash memory 23 and loads only the programs set in the program field of the read program definition record into RAM 21. The process of snapshot generating portion 61 deciding a program definition record to be read out from among a plurality of program definition records included in the program definition table will be described later. Data stored in RAM 21 is then stored into flash memory 23 as a snapshot that is image data. Snapshot generating portion 61 outputs a set of the activation factor set in the activation factor field of the read program definition record and the address information indicating the location in flash memory 23 of the snapshot stored in flash memory 23, to associating portion 63.

In response to input of a set of the activation factor and the address information from snapshot generating portion 61, associating portion 63 generates a snapshot definition record and additionally stores the snapshot definition record in a snapshot definition table stored in flash memory 23. A snapshot definition record includes an activation factor field and an address information field. An activation factor is set in the activation factor field, and address information indicating the location in flash memory 23 storing the snapshot corresponding to the activation factor is set in the address information field.

Snapshot generating portion 61 refers to the snapshot definition table and the program definition table stored in flash memory 23 to read out a program definition record in which an activation factor not stored in any of one or more snapshot definition records included in the snapshot definition table is set in the activation factor field, from the program definition table.

Snapshot acquiring portion 51 may download a snapshot from a predetermined server. In this case, snapshot generating portion 61 is not necessary. In the server, a plurality of snapshots corresponding to the same model as CPU 11 of MFP 100 are stored in association with activation factors. Snapshot acquiring portion 51 downloads sets of an activation factor and a snapshot corresponding to the activation factor, according to the number of activation factors, and stores a plurality of snapshots included in the downloaded sets into flash memory 23. Snapshot acquiring portion 51 outputs a set of the activation factor and the address information indicating the location in flash memory 23 of the snapshot stored in flash memory 23 to associating portion 63. In response to input of a set of the activation factor and the address information, associating portion 63 generates a snapshot definition record and additionally stores the snapshot definition record into the snapshot definition table stored in flash memory 23.

FIG. 6 shows an example of the snapshot definition table. Referring to FIG. 6, the snapshot definition table includes a snapshot definition record for each of a plurality of activation factors. A snapshot definition record includes an activation factor field and an address information field. An activation factor is set in the activation factor field, and address information indicating the location in flash memory 23 in which the snapshot corresponding to the activation factor is stored is set in the address information field. A snapshot definition record including "maintenance key" in the activation factor field includes "address A" in the address information field. The snapshot stored at the location specified by address A in flash memory 23 includes "maintenance program", "HDD control program", "panel control program" and does not include any other programs.

A snapshot definition record including "status check key" in the activation factor field and a snapshot definition record including "front door OR paper feed tray open" in the activation factor field include "address B" in the address information field. The snapshot stored at the location specified by address B in flash memory 23 includes "error state notifying program", "sensor control program", "panel control program", and "error state notifying program" but does not include any other programs.

A snapshot definition record including "facsimile received" in the activation factor field includes "address C" in the address information field. The snapshot stored at the location specified by address C in flash memory 23 includes "facsimile receiving program", "facsimile control program", "image forming program", and "ASIC control program" but does not include any other programs.

A snapshot definition record including "print job received" in the activation factor field includes "address D" in the address information field. The snapshot stored at the location specified by address D in flash memory 23 includes "print job receiving program", "communication control program", "image forming program", and "ASIC control program" but does not include any other programs.

A snapshot definition record including "others" in the activation factor field includes "address E" in the address information field. The snapshot stored at the location specified by address E in flash memory 23 includes all the programs stored in flash memory 23 and has a size larger than the other snapshots. The snapshot corresponding to the activation factor "others" is hereinafter referred to as a default snapshot.

Returning to FIG. 4, snapshot generating portion 61 refers to the snapshot definition table and the program definition table stored in flash memory 23, and, if there is no program definition record in which the activation factor not set in any of one or more snapshot definition records included in the snapshot definition table is set in the activation factor field, resets RAM 21 and CPU 11 after the read address of a program defined in the boot program stored in flash memory 23 is changed to "address E" set in the address information field of the snapshot definition record including "others" in the activation factor field.

Main mode switching portion 53 switches the operation mode from a drive mode to a stop mode. The drive mode is an operation mode in which main CPU 11 receives power supply from power supply control circuit 17. The stop mode is an operation mode in which main CPU 11 is not supplied with power from power supply control circuit 17. When the operation mode is the drive mode, CPU 11 is driven with power supply from power supply control circuit 17. When the operation mode is the stop mode, CPU 11 is not supplied with power from power supply control circuit 17 and therefore is not driven. When switching the operation mode from the drive mode to the stop mode, main mode switching portion 53 outputs a switch signal to activating CPU 13. The timing when main mode switching portion 53 switches the operation mode from the drive mode to the stop mode can be determined as desired. Examples of the timing include, but not limited to, when an operation is not input to operation panel 115 continuously for a predetermined time and when image forming unit 140 is not driven continuously for a predetermined time.

Recovery portion 55 is activated by activating CPU 13 and reads out the snapshot associated with the activation factor from among one or more snapshots stored in flash memory 23 from flash memory 23 and stores the read snapshot into RAM 21. After storing the snapshot into RAM 21, recovery portion 55 outputs an activation completion signal to main mode switching portion 53.

Specifically, when a reset signal is input from activating CPU 13 after power is supplied from power supply control circuit 17, recovery portion 55 executes the boot program stored in flash memory 23. This boot program defines address information indicating the location in flash memory 23 of any one of one or more snapshots stored in flash memory 23. As will be described later, the address information of the snapshot defined by the boot program is overwritten by activating CPU 13. Recovery portion 55 reads out the snapshot specified by the address information defined by the boot program from flash memory 23 and stores the read snapshot into RAM 21. The snapshot is thus stored in RAM 21 as an executable program, so that CPU 11 enters a state in which it can execute the executable program.

Main mode switching portion 53 includes a switching-after-execution portion 59. When recovery portion 55 stores a snapshot different from the default snapshot that includes all the programs executable by CPU 11 into RAM 21, switching-after-execution portion 59 switches the operation mode from the drive mode to the stop mode after CPU 11 executes the executable program stored in RAM 21 and a series of processing based on the activation factor is finished. When the activation factor is any one of "maintenance key", "status check key", "front door OR paper feed tray open", "facsimile received", and "print job received", a snapshot different from the default snapshot is stored into RAM 21.

Specifically, when the activation factor is "maintenance key", switching-after-execution portion 59 controls HDD 113 and operation panel 115 to read maintenance data stored in HDD 113, generate a screen for managing consumables in MFP 100 based on the maintenance data, and display the generated screen on display unit 118, and thereafter switches the operation mode from the drive mode to the stop mode. The screen for managing consumables includes the remaining paper stocked in the paper feed trays of paper feed unit 150, the remaining level of toner used in the developing unit of image forming unit 140, and the lifetime of each of a photoconductor drum and a heat transfer roller of image forming unit 140. These values are stored in HDD 113 and rewritten every time MFP 100 is driven. When the activation factor is "status check key" or "front door OR paper feed tray open", switching-after-execution portion 59 controls sensor unit 117 and operation panel 115 to generate a screen displaying an error state and display the generated screen on display unit 118, and thereafter switches the operation mode from the drive mode to the stop mode. The screen displaying an error state includes a sensor value detected by sensor unit 117, for example, the quantity of remaining paper detected by the remaining paper detection sensor for detecting the quantity of remaining paper, the open/closed state of the front door detected by the sensor provided in a paper conveyance path for detecting the opening/closing of the front door, and the location of a paper jam in a paper conveyance path detected by the jam sensor.

When the activation factor is "facsimile received", switching-after-execution portion 59 controls facsimile unit 170 to receive facsimile data, controls image forming unit 140 and paper feed unit 150 through engine control ASIC 15 to form an image of facsimile data on paper, and thereafter switches the operation mode from the drive mode to the stop mode. When the activation factor is "print job received", switching-after-execution portion 59 controls communication I/F unit 160 to receive a print job and controls image forming unit 140 and paper feed unit 150 through engine control ASIC 15 to form an image of print data included in the print job on paper, and thereafter switches the operation mode from the drive mode to the stop mode.

Figure 7:
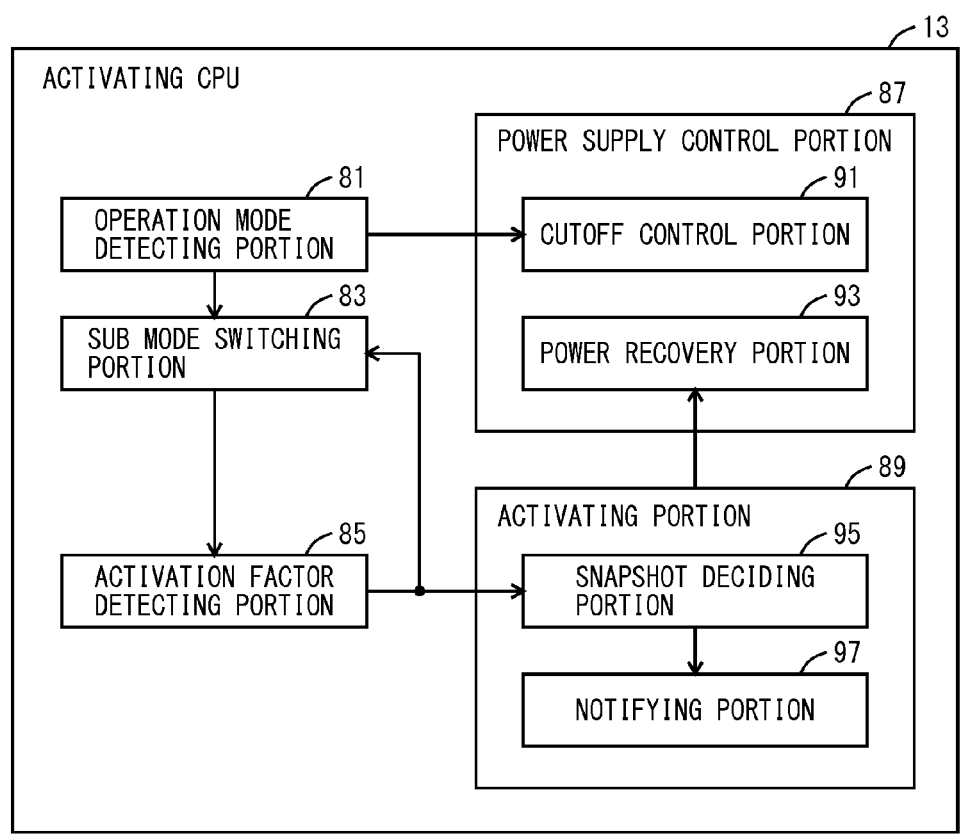
FIG. 7 is a block diagram showing exemplary functions of an activating CPU.

FIG. 7 is a block diagram showing exemplary functions of the activating CPU. The functions shown in FIG. 7 are formed in activating CPU 13 by activating CPU 13 executing a sub activation control program. The sub activation control program is a part of the activation control program. Referring to FIG. 7, activating CPU 13 includes an operation mode detecting portion 81, a sub mode switching portion 83, an activation factor detecting portion 85, a power supply control portion 87, and an activating portion 89.

Operation mode detecting portion 81 detects switching of operation modes by main CPU 11. If a switch signal is input from main CPU 11, operation mode detecting portion 81 detects that main CPU 11 switches the operation mode from the drive mode to the stop mode. When detecting that main CPU 11 switches the operation mode from the drive mode to the stop mode, operation mode detecting portion 81 outputs a switch instruction to power supply control portion 87 and sub mode switching portion 83.

Sub mode switching portion 83 switches the operation mode to one of a normal mode and a power saving mode in which power consumption is lower than in the normal mode. In response to input of a switch signal from operation mode detecting portion 81, sub mode switching portion 83 switches the operation mode from the normal mode to the power saving mode. When switching the operation mode from the normal mode to the power saving mode, sub mode switching portion 83 outputs a detection instruction to activation factor detecting portion 85.

When a detection instruction is input from sub mode switching portion 83, activation factor detecting portion 85 detects an activation factor. Specifically, activation factor detecting portion 85 detects the voltages of the activating terminal, the maintenance terminal, and the status check terminal of panel connector 31, the opening/closing terminal of sensor connector 32, the facsimile notice terminal of FAX connector 33, and the job notice terminal of communication connector 34, and if the voltage of any one of those terminals changes from LOW to HIGH, detects an activation factor. When detecting an activation factor, activation factor detecting portion 85 outputs terminal identification information for identifying the terminal with the voltage changing from LOW to HIGH to activating portion 89 and sub mode switching portion 83.

In the power saving mode, sub mode switching portion 83 switches the operation mode from the power saving mode to the normal mode in response to input of terminal identification information from activation factor detecting portion 85, in other words, in response to the voltage changing from LOW to HIGH at any one of the activating terminal, the maintenance terminal, and the status check terminal of panel connector 31, the opening/closing terminal of sensor connector 32, the facsimile notice terminal of FAX connector 33, and the job notice terminal of communication connector 34.

After sub mode switching portion 83 switches the operation mode to the power saving mode, activating CPU 13 operates in a HALT mode in which no program is executed until the operation mode is switched to the normal mode. In the power saving mode, activating CPU 13 executes only the process of detecting the voltages of the activating terminal, the maintenance terminal, and the status check terminal of panel connector 31, the opening/closing terminal of sensor connector 32, the facsimile notice terminal of FAX connector 33, and the job notice terminal of communication connector 34. In other words, activating CPU 13 enables only activation factor detecting portion 85 in the power saving mode. Therefore, activating CPU 13 can reduce power consumption in the power saving mode when compared with the normal mode.

While main CPU 11 switches the operation mode from the drive mode to the stop mode, activating portion 89 activates main CPU 11 in response to an activation factor being detected by activation factor detecting portion 85. Specifically, activating portion 89 activates main CPU 11 by outputting a reset signal to the reset terminal of main CPU 11. Activating portion 89 includes a snapshot deciding portion 95 and a notifying portion 97.

In response to input of terminal identification information from activation factor detecting portion 85, snapshot deciding portion 95 refers to the snapshot definition table stored in flash memory 23 to decide a snapshot and outputs the address information of the decided snapshot to notifying portion 97.

Specifically, when the terminal identification information of the maintenance terminal of panel connector 31 is input, snapshot deciding portion 95 decides that the activation factor is "maintenance key". Snapshot deciding portion 95 refers to snapshot definition table stored in flash memory 23 to decide on the snapshot stored at the address information "address A" corresponding to the decided activation factor "maintenance key" and outputs the address information "address A" to notifying portion 97.

When the terminal identification information of the status check terminal of panel connector 31 is input, snapshot deciding portion 95 decides that the activation factor is "status check key". Snapshot deciding portion 95 refers to the snapshot definition table stored in flash memory 23 to decide on the snapshot stored at the address information "address B" corresponding to the decided activation factor "status check key" and outputs the address information "address B" to notifying portion 97.

When the terminal identification information of the opening/closing terminal of sensor connector 32 is input, snapshot deciding portion 95 decides that the activation factor is "front door OR paper feed tray open". Snapshot deciding portion 95 refers to the snapshot definition table stored in flash memory 23 to decide on the snapshot stored at the address information "address B" corresponding to the decided activation factor "front door OR paper feed tray open" and outputs the address information "address B" to notifying portion 97.

When the terminal identification information of the facsimile notice terminal of FAX connector 33 is input, snapshot deciding portion 95 decides that the activation factor is "facsimile received". Snapshot deciding portion 95 refers to the snapshot definition table stored in flash memory 23 to decide on the snapshot stored at the address information "address C" corresponding to the decided activation factor "facsimile received" and outputs the address information "address C" to notifying portion 97.

When the terminal identification information of the job notice terminal of communication connector 34 is input, snapshot deciding portion 95 decides that the activation factor is "print job received". Snapshot deciding portion 95 refers to the snapshot definition table stored in flash memory 23 to decide on the snapshot stored at the address information "address D" corresponding to the decided activation factor "print job received" and outputs the address information "address D" to notifying portion 97.

When the terminal identification information of the activating terminal of panel connector 31 is input and the terminal identification information of the maintenance terminal or the status check terminal of panel connector 31 is not input, snapshot deciding portion 95 decides that the activation factor is "others". Snapshot deciding portion 95 refers to the snapshot definition table stored in flash memory 23 to decide on the snapshot stored at the address information "address E" corresponding to the decided activation factor "others" and outputs the address information "address E" to notifying portion 97.

In response to input of the address information from snapshot deciding portion 95, notifying portion 97 notifies main CPU 11 of the snapshot. Specifically, the read address of a program defined by the boot program of main CPU 11 stored in flash memory 23 is overwritten with the address information input from snapshot deciding portion 95. After notifying portion 97 rewrites the boot program, activating portion 89 outputs a power feed instruction to power supply control portion 87 and outputs a reset signal to the reset terminal of main CPU 11.

Power supply control portion 87 controls power supply control circuit 17 to switch power to be supplied to main CPU 11, engine control ASIC 15, RAM 21, and flash memory 23. Power supply control portion 87 includes a cutoff control portion 91 and a power recovery portion 93. In response to input of a switch instruction from operation mode detecting portion 81, cutoff control portion 91 allows power supply control circuit 17 to cut off power supplied to main CPU 11, engine control ASIC 15, RAM 21, and flash memory 23. Since power supply control circuit 17 does not supply power to main CPU 11, engine control ASIC 15, RAM 21, and flash memory 23, no power is consumed in main CPU 11, engine control ASIC 15, RAM 21, and flash memory 23. Although activating CPU 13 is driven with power supplied from power supply control circuit 17, power consumed in activating CPU 13 is also smaller than power consumed in the normal mode because the operation mode is switched to the power saving mode.

In response to input of a power feed instruction from activating portion 89, power recovery portion 93 allows power supply control circuit 17 to supply power to main CPU 11, engine control ASIC 15, RAM 21, and flash memory 23. As a result, main CPU 11, engine control ASIC 15, RAM 21, and flash memory 23 are driven. When power is supplied from power supply control circuit 17 and a reset signal is input from activating CPU 13, main CPU 11 executes the boot program stored in flash memory 23. Since the read address of the program is overwritten by notifying portion 97 in this boot program, the snapshot decided by snapshot deciding portion 95, in other words, the snapshot corresponding to the activation factor is read out from flash memory 23 and stored into RAM 21. Therefore, when the activation factor is not "others", a snapshot other than the default snapshot is stored into RAM 21. Since a snapshot other than the default snapshot has a size smaller than the default snapshot, the time for main CPU 11 to finish storing the snapshot into RAM 21 can be reduced. As a result, the time until main CPU 11 becomes able to execute a process can be reduced.

Figure 8:
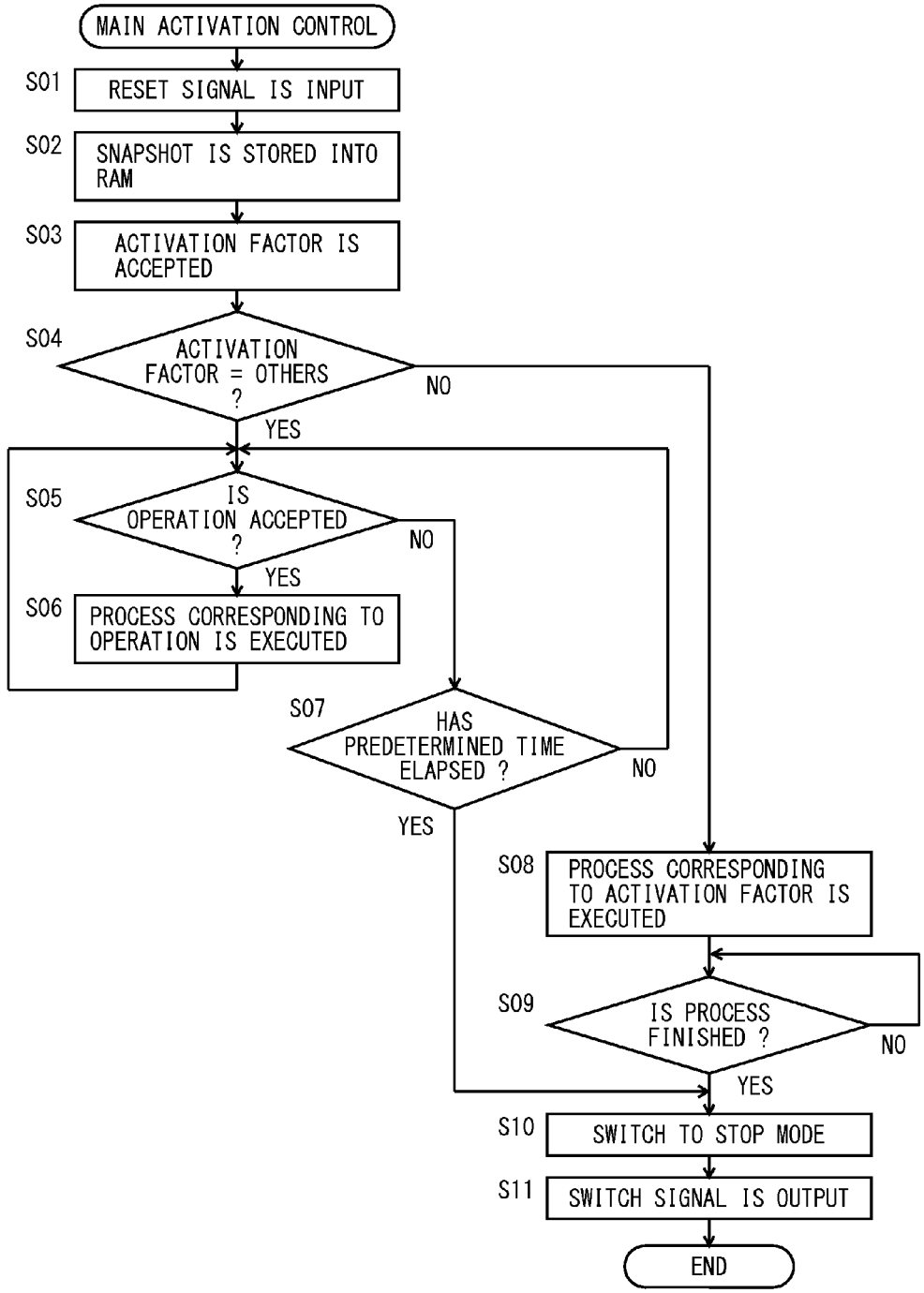
FIG. 8 is a flowchart showing an example of the procedure of a main activation control process.

FIG. 8 is a flowchart showing an example of the procedure of a main activation control process. The main activation control process is a process executed by main CPU 11 by main CPU 11 executing the main activation control program. The main activation control program is a part of the activation control program. Referring to FIG. 8, main CPU 11 receives a reset signal (step S01). Here, activating CPU 13 outputs a reset signal to the reset terminal of main CPU 11. Main CPU 11 receiving the reset signal stores a snapshot into RAM 21. Specifically, main CPU 11 executes the boot program stored in flash memory 23. Main CPU 11 reads out the snapshot specified by the address information defined by the boot program, among a plurality of snapshots stored in flash memory 23, from flash memory 23 and stores the read snapshot into RAM 21.

In the next step S03, an activation factor is accepted, and the process proceeds to step S04. In step S01, if a reset signal is input from activating CPU 13, an activation factor is detected by activating CPU 13, and the detected activation factor is accepted. Activation factors include the activation factor "maintenance key" that is an event in which the voltage of the maintenance terminal of panel connector 31 changes from LOW to HIGH, the activation factor "status check key" that is an event in which the voltage of the status check terminal of panel connector 31 changes from LOW to HIGH, the activation factor "front door OR paper feed tray open" that is an event in which the voltage of the opening/closing terminal of sensor connector 32 changes from LOW to HIGH, the activation factor "facsimile received" that is an event in which the voltage of the facsimile notice terminal of FAX connector 33 changes from LOW to HIGH, the activation factor "print job received" that is an event in which the voltage of the job notice terminal of communication connector 34 changes from LOW to HIGH, and the activation factor "others" that is an event in which the voltage of the activating terminal of panel connector 31 changes from LOW to HIGH but the voltage of neither the maintenance terminal nor the status check terminal changes.

In step S04, it is determined whether the activation factor is "others". If the activation factor is "others", the process proceeds to step S05. If not, the process proceeds to step S08. If the activation factor "others" is accepted, the snapshot stored in RAM 21 in step S02 includes all the programs stored in flash memory 23.

In the next step S05, it is determined whether an operation is accepted. The operation input by the user to operation unit 119 is accepted. If an operation is accepted, the process proceeds to step S06. If not, the process proceeds to step S07. In step S06, the process is executed in accordance with the accepted operation, and the process returns to step S05. In step S07, it is determined whether a predetermined time has elapsed without accepting an operation. If a predetermined time has elapsed without accepting an operation, the process proceeds to step S10. If not, the process returns to step S05.

In step S08, the process corresponding to the activation factor is executed. Specifically, if the activation factor "maintenance key" is accepted, a screen for managing consumables in MFP 100 is generated and displayed on display unit 118. Since the snapshot stored in RAM 21 in step S02 includes the maintenance program, the HDD control program and the panel control program, main CPU 11 can execute these processes.

If the activation factor "status check key" or the activation factor "front door OR paper feed tray open" is accepted, a screen displaying an error state is displayed on display unit 118. Since the snapshot stored in RAM 21 in step S02 includes the error state notifying program, the sensor control program, and the panel control program, main CPU 11 can execute these processes.

If the activation factor "facsimile received" is detected, facsimile unit 170 is controlled to receive facsimile data, and image forming unit 140 and paper feed unit 150 are controlled through engine control ASIC 15 to form an image of facsimile data on paper. Since the snapshot stored in RAM 21 in step S02 includes the facsimile receiving program, the facsimile control program, the image forming program, and the ASIC control program, main CPU 11 can execute these processes.

If the activation factor "print job received" is detected, communication I/F unit 160 is controlled to receive a print job, and image forming unit 140 and paper feed unit 150 are controlled through engine control ASIC 15 to form an image of print data included in the print job on paper. Since the snapshot stored in RAM 21 in step S02 includes the print job receiving program, the communication control program, the image forming program, and the ASIC control program, main CPU 11 can execute these processes.

In step S09, it is determined whether the process corresponding to the activation factor is finished. The process waits until the process is finished (NO in step S09). If the process is finished (YES in step S09), the process proceeds to step S10.

In step S10, the operation mode is switched to the stop mode. Accordingly, power consumed in the hardware resources controlled by CPU 11 is reduced. In the next step S11, a switch signal is output to activating CPU 13. The process then ends.

Figure 9:
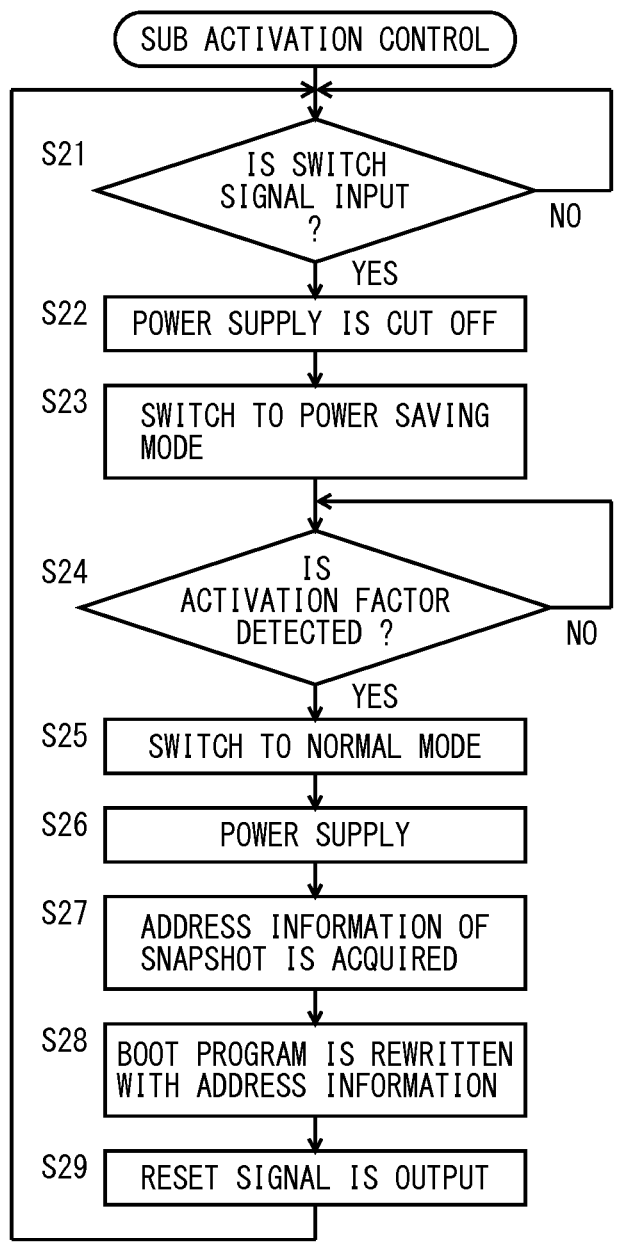
FIG. 9 is a flowchart showing an example of the procedure of a sub activation control process.

FIG. 9 is a flowchart showing an example of the procedure of a sub activation control process. The sub activation control process is a process executed by activating CPU 13 by activating CPU 13 executing the sub activation control program. The sub activation control program is a part of the activation control program.

Referring to FIG. 9, activating CPU 13 determines whether a switch signal is input from main CPU 11 (step S21). The process waits until a switch signal is input (NO in step S21). If a switch signal is input (YES in step S21), the process proceeds to step S22.

In step S22, the power supply is cut off. Specifically, power supply control circuit 17 cuts off power supplied to main CPU 11, engine control ASIC 15, RAM 21, and flash memory 23. Power is thus not consumed in main CPU 11, engine control ASIC 15, RAM 21, and flash memory 23.

In the next step S23, the operation mode is switched from the normal mode to the power saving mode. After the operation mode is switched to the power saving mode, activating CPU 13 operates in the HALT mode in which no program is executed until the operation mode is switched to the normal mode. In the power saving mode, activating CPU 13 executes only the process of detecting the voltages of the activating terminal, the maintenance terminal, and the status check terminal of panel connector 31, the opening/closing terminal of sensor connector 32, the facsimile notice terminal of FAX connector 33, and the job notice terminal of communication connector 34. Activating CPU 13 thus can reduce power consumption in the power saving mode when compared with the normal mode.

In the next step S24, it is determined whether an activation factor is detected. The process waits until an activation factor is detected (NO in step S24). If an activation factor is detected (YES in step S24), the process proceeds to step S25. Specifically, if the voltage of the maintenance terminal of panel connector 31 changes from LOW to HIGH, the activation factor "maintenance key" is detected. If the voltage of the status check terminal of panel connector 31 changes from LOW to HIGH, the activation factor "status check key" is detected. If the voltage of the opening/closing terminal of sensor connector 32 changes from LOW to HIGH, the activation factor "front door OR paper feed tray open" is detected. If the voltage of the facsimile notice terminal of FAX connector 33 changes from LOW to HIGH, the activation factor "facsimile received" is detected. If the voltage of the job notice terminal of communication connector 34 changes from LOW to HIGH, the activation factor "print job received" is detected. If the voltage of the activating terminal of panel connector 31 changes from LOW to HIGH and the voltage of neither the maintenance terminal nor the status check terminal of panel connector 31 changes from LOW to HIGH, the activation factor "others" is detected.

In step S25, the operation mode is switched to the normal mode. Power is then supplied to main CPU 11, engine control ASIC 15, RAM 21, and flash memory 23. Specifically, power supply control circuit 17 is controlled such that power supply control circuit 17 supplies power to main CPU 11, engine control ASIC 15, RAM 21, and flash memory 23.

In the next step S27, the address information of the snapshot corresponding to the activation factor detected in step S24 is acquired. Specifically, by referring to the snapshot definition table stored in flash memory 23, the address information indicating the location where the snapshot corresponding to the activation factor detected in step S24 is stored in flash memory 23 is acquired. Specifically, if the activation factor "maintenance key" is detected, the address information "address A" is acquired. If the activation factor "status check key" is detected, the address information "address B" is acquired. If the activation factor "front door OR paper feed tray open" is detected, the address information "address B" is acquired. If the activation factor "facsimile received" is detected, the address information "address C" is acquired. If the activation factor "print job received" is detected, the address information "address D" is acquired. If the activation factor "others" is detected, the address information "address E" is acquired.

In the next step S28, the address information of the boot program of main CPU 11 is overwritten. Specifically, the read address of a program defined by the boot program of main CPU stored in flash memory 23 is overwritten with the address information acquired in step S28. A reset signal is then output to the reset terminal of main CPU 11 (step S29), and the process returns to step S21.

As described above, MFP 100 in the present embodiment functions as an image forming apparatus. For each of a plurality of sets including one or more of a plurality of programs executable by main CPU 11, a snapshot that includes an executable program obtained by main CPU 11 loading one or more programs included in the set into RAM 21 is stored in flash memory 23. Main CPU 11 associates any one of a plurality of activation factors with each of a plurality of snapshots. In response to any of a plurality of activation factors being detected while main CPU 11 and RAM 21 are not supplied with power, activating CPU 13 activates main CPU 11. In response to the operation mode being switched to the stop mode by main CPU 11, power supplied to main CPU 11 and RAM 21 is cut off. Power is thus not consumed by main CPU 11 and RAM 21, thereby reducing power consumption.

In response to being activated by activating CPU 13, main CPU 11 reads out the snapshot associated with the activation factor detected by activating CPU 13 from flash memory 23 and stores the read snapshot into RAM 21. Since the snapshot includes one or more of a plurality of programs, and the snapshot associated with the activation factor is stored in RAM 21, the snapshot that includes only the program that executes the process corresponding to the activation factor is stored. Since the size of the snapshot is smaller than the size of the default snapshot, the time until main CPU 11 becomes able to execute a process can be reduced.

Activating CPU 13 specifies the snapshot associated with the detected activation factor by the program definition table, specifies the address information indicating the location where the specified snapshot is stored in flash memory 23 by referring to the snapshot definition table, and outputs the address information to main CPU 11. Main CPU 11 thus can store the snapshot associated with the activation factor into RAM 21.

A snapshot that includes the executable program obtained by main CPU 11 loading all of a plurality of programs into RAM 21 is stored by default in flash memory 23, and activation factors except specific factors among a plurality of activation factors are associated with the default snapshot. Specific factors are, for example, "maintenance key", "status check key", "front door OR paper feed tray open", "facsimile received", and "print job received", and an activation factor except the specific factors is "others". Therefore, when an activation factor except the specific factors is detected, the image forming apparatus can execute all the executable processes.

Main CPU 11 refers to the program definition table and stores the executable program obtained by loading at least one of a plurality of programs into RAM 21 into flash memory 23 as a snapshot. Main CPU 11 thus can generate a plurality of snapshots.

If the activation factor is a specific factor, main CPU 11 switches the operation mode to the stop mode after executing the process determined by the activation factor. Power consumption thus can be further reduced.

In response to the voltage of any one of the activating terminal, the maintenance terminal, and the status check terminal of panel connector 31, the opening/closing terminal of sensor connector 32, the facsimile notice terminal of FAX connector 33, and the job notice terminal of communication connector 34 changing from LOW to HIGH, activating CPU 13 detects the activation factor corresponding to the terminal with voltage changed, among the activating terminal, the maintenance terminal, and the status check terminal of panel connector 31, the opening/closing terminal of sensor connector 32, the facsimile notice terminal of FAX connector 33, and the job notice terminal of communication connector 34. The activation factor thus can be easily detected. In addition, power consumption by activating CPU 13 can be reduced because it is only necessary to detect that the voltage changes at any one of the activating terminal, the maintenance terminal, and the status check terminal of panel connector 31, the opening/closing terminal of sensor connector 32, the facsimile notice terminal of FAX connector 33, and the job notice terminal of communication connector 34.

In response to the operation mode of main CPU 11 being switched to the stop mode, activating CPU 13 switches the operation mode to the power saving mode. In response to the voltage changing at any one of the activating terminal, the maintenance terminal, and the status check terminal of panel connector 31, the opening/closing terminal of sensor connector 32, the facsimile notice terminal of FAX connector 33, and the job notice terminal of communication connector 34 in the power saving mode, the operation mode is switched to the normal mode. Power is thus not consumed in main CPU 11 until an activation factor is detected after main CPU 11 is stopped.

Although snapshot acquiring portion 51 is provided in main CPU 11 in the present embodiment, it may be provided in activating CPU 13.

Modification

Figure 10:
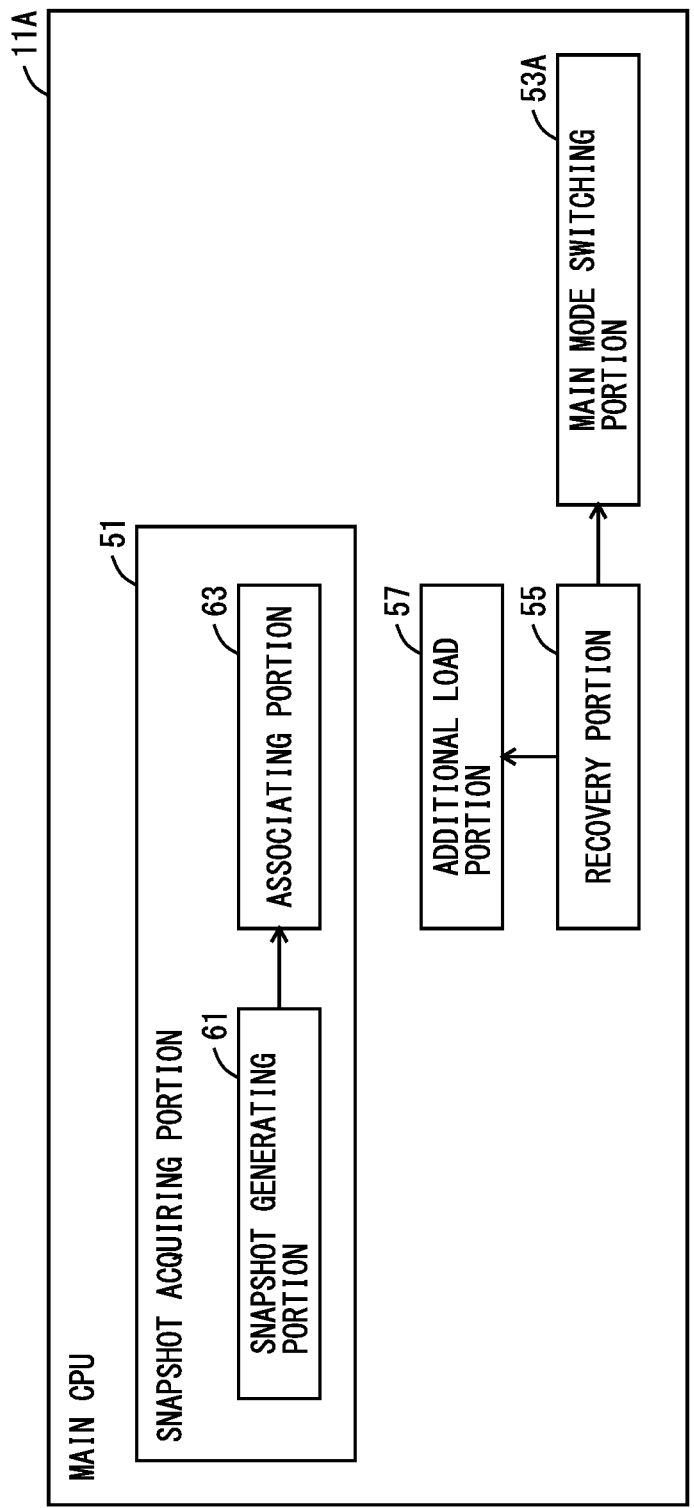
FIG. 10 is a block diagram showing exemplary functions of the main CPU in a modification.

FIG. 10 is a block diagram showing exemplary functions of the main CPU in a modification. Referring to FIG. 10, the functions differ from those in FIG. 4 in that an additional load portion 57 is added and that main mode switching portion 53 is changed to a main mode switching portion 53A. The other functions are the same as the functions shown in FIG. 4 and a description thereof is not repeated here.

After a snapshot is stored into RAM 21, recovery portion 55 outputs an activation completion signal to main mode switching portion 53 and additional load portion 57.

Main mode switching portion 53A receiving the activation completion signal from recovery portion 55 sets the operation mode to the drive mode. Main mode switching portion 53A switches the operation mode from the drive mode to the stop mode at a predetermined timing. A predetermined timing at which main mode switching portion 53 switches the operation mode from the drive mode to the stop mode can be set as desired. When switching the operation mode from the drive mode to the stop mode, main mode switching portion 53A outputs a switch signal to activating CPU 13.

If a snapshot different from the default snapshot is stored in RAM 21, after CPU 11 finishes a series of processing based on the activation factor in response to input of an activation completion signal from recovery portion 55, additional load portion 57 loads the remaining programs that are not included in the snapshot stored in RAM 21 among a plurality of programs, into RAM 21, when an activation factor is detected in response to the voltage of the activating terminal changing from LOW to HIGH. The user thus allows MFP 100 to execute a process based on the program not included in the snapshot. The voltage of the activating terminal changes from LOW to HIGH when the user presses a key except the maintenance key and the status check key among a plurality of hard keys of operation unit 119 or when the user performs the operation of touching the touch panel of operation unit 119.

In the image forming apparatus in the modification, main CPU 11 loads the remaining one or more programs not included in the snapshot stored in RAM 21 among a plurality of programs, into RAM 21, after executing a process based on the activation factor. Therefore, after the process based on the activation factor is executed, a process other than the process based on the activation factor can be executed.

Although MFP 100 has been described as an example of the image forming apparatus in the foregoing embodiment, it is needless say that the invention can be understood as an activation control method that allows main CPU 11 to perform the main activation control process shown in FIG. 8 and allows activating CPU 13 to perform the sub activation control process shown in FIG. 9 and as a main activation control program that allows main CPU 11 to perform the main activation control process shown in FIG. 8 and a sub activation control program that allows activating CPU 13 to perform the sub activation control process shown in FIG. 9.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a main processor to execute a program;
   a first memory to store an executable program loaded by the main processor to execute a program, the first memory being a volatile memory;
   a sub processor to activate the main processor; and a second memory accessible by the main processor and the sub processor, the second memory being a non-volatile memory, the second memory storing, for each of a plurality of sets including one or more of a plurality of programs executable by the main processor, a snapshot that includes an executable program obtained by the main processor loading one or more programs included in the set into the first memory, one of the main processor and the sub processor executing an association step of associating any one of a plurality of activation factors with each of a plurality of snapshots respectively corresponding to the plurality of sets, the main processor executing a mode switching step of switching an operation mode from a drive mode in which power is supplied to a stop mode in which power is not supplied, the sub processor executing a power supply control step of switching power supplied to the main processor and the first memory, an activation factor detecting step of detecting any one of a plurality of activation factors while power is not supplied to the main processor, and an activation step of activating the main processor in response to any one of the plurality of activation factors being detected in the activation factor detecting step, the power supply control step including a cutoff step of cutting off power supplied to the main processor and the first memory in response to an operation mode being switched to the stop mode in the mode switching step, and a power recovery step of supplying power to the main processor and the first memory before the main processor is activated in the activation step, the main processor further executing a recovery step of, in response to being activated by the sub processor, reading out a snapshot associated with the detected activation factor in the association step from the second memory and storing the read snapshot into the first memory, the activation step further includes a notification step of notifying the main processor of address information indicating a location where the snapshot associated with the detected activation factor in the association step is stored in the second memory, and the recovery step includes a step of reading out a snapshot stored at the location specified by the address information given from the sub processor in the second memory and storing the read snapshot into the first memory.

2. The image forming apparatus according to claim 1, wherein the second memory stores a snapshot by default that includes an executable program obtained by the main processor loading all of a plurality of programs into the first memory, and the association step includes a step of associating an activation factor except predetermined one or more specific factors among the plurality of activation factors with the default snapshot.

3. The image forming apparatus according to claim 1, wherein the notification step includes a step of storing the address information at a location defined by a boot program executed by the main processor in response to being activated, in a storage area of the second memory.

4. The image forming apparatus according to claim 1, wherein the main processor further executes a snapshot generating step of storing an executable program obtained by loading at least one of the plurality of programs in the first memory as a snapshot, into the second memory.

5. The image forming apparatus according to claim 1, wherein the mode switching step includes a switching-after-execution step of switching an operation mode to the stop mode after a process defined by the detected activation factor is executed.

6. The image forming apparatus according to claim 1, wherein the main processor further executes an additional loading step of loading one or more remaining programs not included in the snapshot stored in the first memory, among the plurality of programs, into the first memory, after a process based on the detected activation factor is executed.

7. The image forming apparatus according to claim 1, wherein
the sub processor includes a plurality of input terminals corresponding to the plurality of activation factors, and
the activation factor detecting step includes a step of, in response to input of a signal to any one of the plurality of input terminals, detecting an activation factor corresponding to the input terminal receiving the signal among the plurality of input terminals.

8. The image forming apparatus according to claim 1, wherein
the sub processor further executes a sub mode switching step of switching an operation mode to one of a normal mode and a power saving mode in which power consumption is lower than in the normal mode, and
the sub mode switching step includes
a step of switching an operation mode to the power saving mode in response to an operation mode of the main processor being switched to the stop mode, and
a step of switching an operation mode to the normal mode in response to any one of the plurality of activation factors being detected in the activation factor detecting step.

9. The image forming apparatus according to claim 1, further comprising a snapshot definition table that includes:
an activation factor field identifying a plurality of activation factors, and
an address information field identifying an address in the second memory where a snapshot associated with a particular activation factor is stored.

10. An activation control method performed in an image forming apparatus,
the image forming apparatus including
a main processor to execute a program,
a first memory to store an executable program loaded by the main processor to execute a program, the first memory being a volatile memory,
a sub processor to activate the main processor, and
a second memory accessible by the main processor and the sub processor, the second memory being a non-volatile memory,
the second memory storing, for each of a plurality of sets including one or more of a plurality of programs executable by the main processor, a snapshot that includes an executable program obtained by the main processor loading one or more programs included in the set into the first memory,
the method allowing:
one of the main processor and the sub processor to execute an association step of associating any one of a plurality of activation factors with each of a plurality of snapshots respectively corresponding to the plurality of sets;

the main processor to execute a mode switching step of switching an operation mode from a drive mode in which power is supplied to a stop mode in which power is not supplied; and the sub processor to execute a power supply control step of switching power supplied to the main processor and the first memory, an activation factor detecting step of detecting any one of a plurality of activation factors while power is not supplied to the main processor, and an activation step of activating the main processor in response to any one of the plurality of activation factors being detected in the activation factor detecting step, the power supply control step including a cutoff control step of cutting off power supplied to the main processor and the first memory in response to an operation mode being switched to the stop mode in the mode switching step, and a power recovery step of supplying power to the main processor and the first memory before the main processor is activated in the activation step, the method further allowing the main processor to execute a recovery step of, in response to being activated by the sub processor, reading out a snapshot associated with the detected activation factor in the association step from the second memory and storing the read snapshot into the first memory, the activation step further includes a notification step of notifying the main processor of address information indicating a location where the snapshot associated with the detected activation factor in the association step is stored in the second memory, and the recovery step includes a step of reading out a snapshot stored at the location specified by the address information given from the sub processor in the second memory and storing the read snapshot into the first memory.

11. The activation control method according to claim 10, wherein the second memory stores a snapshot by default that includes an executable program obtained by the main processor loading all of a plurality of programs into the first memory, and the association step includes a step of associating an activation factor except predetermined one or more specific factors among the plurality of activation factors with the default snapshot.

12. The activation control method according to claim 10, wherein the notification step includes a step of storing the address information at a location defined by a boot program executed by the main processor in response to being activated, in a storage area of the second memory.

13. The activation control method according to claim 10, wherein the method further allows the main processor to execute a snapshot generating step of storing an executable program obtained by loading at least one of the plurality of programs in the first memory as a snapshot, into the second memory.

14. The activation control method according to claim 10, wherein the mode switching step includes a switching-after-execution step of switching an operation mode to the stop mode after a process defined by the detected activation factor is executed.

15. The activation control method according to claim 10, wherein the method allows the main processor to further execute an additional loading step of loading one or more remaining programs not included in the snapshot stored in the first memory, among the plurality of programs, into the first memory, after a process based on the detected activation factor is executed.

16. The activation control method according to claim 10, wherein the sub processor includes a plurality of input terminals corresponding to the plurality of activation factors, and the activation factor detecting step includes a step of, in response to input of a signal to any one of the plurality of input terminals, detecting an activation factor corresponding to the input terminal receiving the signal among the plurality of input terminals.

17. The activation control method according to claim 10, wherein the method further allows the sub processor to execute a sub mode switching step of switching an operation mode to one of a normal mode and a power saving mode in which power consumption is lower than in the normal mode, and the sub mode switching step includes a step of switching an operation mode to the power saving mode in response to an operation mode of the main processor being switched to the stop mode, and a step of switching an operation mode to the normal mode in response to any one of the plurality of activation factors being detected in the activation factor detecting step.

18. The activation control method according to claim 10, wherein the image processing apparatus further comprises a snapshot definition table that includes:

an activation factor field identifying a plurality of activation factors, and an address information field identifying an address in the second memory where a snapshot associated with a particular activation factor is stored.

19. A non-transitory computer-readable recording medium encoded with an activation control program executed in an image forming apparatus, the image forming apparatus including a main processor to execute a program, a first memory to store an executable program loaded by the main processor to execute a program, the first memory being a volatile memory, a sub processor to activate the main processor, and a second memory accessible by the main processor and the sub processor, the second memory being a non-volatile memory, the second memory storing, for each of a plurality of sets including one or more of a plurality of programs executable by the main processor, a snapshot that includes an executable program obtained by the main processor loading one or more programs included in the set into the first memory, the program causing:

one of the main processor and the sub processor to execute an association step of associating any one of a plurality of activation factors with each of a plurality of snapshots respectively corresponding to the plurality of sets;

the main processor to execute a mode switching step of switching an operation mode from a drive mode in which power is supplied to a stop mode in which power is not supplied; and the sub processor to execute a power supply control step of switching power supplied to the main processor and the first memory, an activation factor detecting step of detecting any one of a plurality of activation factors while power is not supplied to the main processor, and an activation step of activating the main processor in response to any one of the plurality of activation factors being detected in the activation factor detecting step, the power supply control step including a cutoff control step of cutting off power supplied to the main processor and the first memory in response to an operation mode being switched to the stop mode in the mode switching step, and a power recovery step of supplying power to the main processor and the first memory before the main processor is activated in the activation step, the program further causing the main processor to execute a recovery step of, in response to being activated by the sub processor, reading out a snapshot associated with the detected activation factor in the association step from the second memory and storing the read snapshot into the first memory, the activation step further includes a notification step of notifying the main processor of address information indicating a location where the snapshot associated with the detected activation factor in the association step is stored in the second memory, and the recovery step includes a step of reading out a snapshot stored at the location specified by the address information given from the sub processor in the second memory and storing the read snapshot into the first memory.

* * * * *